United States Patent
Chkodrov et al.

(10) Patent No.: US 6,895,581 B1
(45) Date of Patent: May 17, 2005

(54) REPLACEABLE CLASSES AND VIRTUAL CONSTRUCTORS FOR OBJECT-ORIENTED PROGRAMMING LANGUAGES

(75) Inventors: Gueorgui B. Chkodrov, Redmond, WA (US); Jared M. Green, Redmond, WA (US); Narinder Kaur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/539,090

(22) Filed: Mar. 30, 2000

(51) Int. Cl.[7] .................................................. G06F 9/45
(52) U.S. Cl. ........................ 717/159; 717/142; 717/143; 717/145; 717/153
(58) Field of Search ................................ 717/140–161, 717/101–121

(56) References Cited

U.S. PATENT DOCUMENTS

| | | | |
|---|---|---|---|
| 5,790,861 A | * | 8/1998 | Rose et al. ................. 717/145 |
| 6,385,769 B1 | * | 5/2002 | Lewallen ..................... 717/125 |
| 6,446,259 B2 | * | 9/2002 | Brett ........................... 717/165 |

OTHER PUBLICATIONS

Stroustrup, Bjarne, *The C++ Programming Language* (Third Edition), Addison–Wesley, 1997, pp. 301–326.

Horton, Ivor, *Ivor Horton's Beginning Visual C++ 6*, Wrox Press, 1998, pp. 1010–1063.

Liberty, Jesse, *Teach Yourself C++ in 21 Days* (Second Edition), Sam's Publishing, 1997, pp. 315–346.

\* cited by examiner

*Primary Examiner*—Tuan Dam
*Assistant Examiner*—Chuck Kendall
(74) *Attorney, Agent, or Firm*—Leydig, Voit & Mayer, Ltd.

(57) ABSTRACT

An extension of object-oriented programming languages enables the use of replaceable classes and virtual constructors, thereby allowing existing code that creates objects of a base class to be reusable for creating instances of a new class derived from the base class. A base class intended to be replaceable later is declared to be replaceable. In the case of a compiled language, the programming code defining and using the base class is compiled into a reusable module. Later, a new class derived from the base class is identified as a replacement for the base class and is used in new programming code that uses the existing reusable module. The replacement relationship between the old base class and the new class is registered. During execution of the program, when the old code of the reusable module indicates the creation of an object of the base class, the registered replacement information is referenced. If the old class is to be replaced with the new class, the creation information for the new class is passed instead so that an object of the new class is created. The class replacement may be implemented with compiled and interpreted programming languages. When a compiled language is used, the class replacement may be implemented with new compiler-supported features that emit data for class replacement into the .obj files, but may also be implemented without requiring changes to existing compilers.

12 Claims, 8 Drawing Sheets

REPLACEABLE CLASSES AND VIRTUAL CONSTRUCTORS FOR OBJECT-ORIENTED PROGRAMMING LANGUAGES

TECHNICAL FIELD OF THE INVENTION

This invention relates generally to computer programming languages, and more particularly to the use of classes in object-oriented programming languages.

BACKGROUND OF THE INVENTION

Object-oriented programming languages, especially the C++ language, have recently become the standard languages for developing computer software applications. The essence of object-oriented programming is to treat data and the procedures that act upon the data as individual "objects," each of which is a self-contained entity with an identity and certain characteristics of its own. Each object type is defined by a "class" defined in the source code of the software application. A class specifies how objects of its type behave, such as how they are created, how they can be manipulated, and how they are destroyed. An object of a given class is an "instance" of that class that is created, used, and destroyed during the execution of the software application. The most fundamental notion of object-oriented programming is that classes may be designed by a software developer to represent the fundamental concepts of the "reality" being modeled for the application.

An important aspect of the use of classes in object-oriented programming is the concept of inheritance. A class may be defined as being derived from another class that is referred to as its "base class." The derived class inherits from the base class in that an object of the derived class automatically gets the data and method members of the base class. The derived class may refine the concept represented by the base class by defining additional data or method members or redefining method members to override those of the base class. Class inheritance provides the powerful intellectual tool of hierarchical ordering for managing the complexity of a program. In this regard, a program can often be organized as a set of trees or directed acyclic graphs of classes. Each node of the tree may be a class derived from another class and may itself be the base class for another derived class.

In many software development projects, a software application is constantly being refined over the life span of the project. Through the development process, concepts concerning various problems and solutions are often revised many times, and the functions and features of the final software application are often quite different from those defined at the beginning of the project. When an object-oriented programming language, such as the C++ language, is used to develop the software, the revisions of concepts would result in the introduction of new classes. In this regard, it is common for program developers to start with a set of broadly defined base classes, and incrementally refine the concepts by designing new classes derived from the existing base classes to provide specific features and functionality. It is also common to design a set of reusable executable modules to provide some common functionality. For instance, the reusable modules may be dynamic-link library (DLL) files that are dynamically linked during the execution of the software product to provide their functionality.

One common problem encountered in developing software applications with object-oriented programming languages is that existing code that creates objects of a base class cannot be reused to create objects of a new class derived from the base class. For instance, in the early stage of software development, a base class may be designed to present general aspects of a user-interface feature, and a new derived class may be designed later to provide specific contents of the user-interface feature. Instructions to create objects of the base class may be included in a program module that has already been tested and is intended to be reusable. The problem is that such a module becomes obsolete when objects of the newly developed derived class are to be created. In order to create objects of the new class, the source listings of the reusable module has to be modified to include the definition of the new class and instructions for creating objects of the new class. In the case of a compilable language, the revised source listing then has to be recompiled to generate a revised module that can create objects of the new class.

Thus, the introduction of a new derived class may require extensive editing and recompilation of existing source listing originally programmed to create objects of the old base classes. This process can be very time consuming and prone to errors, especially when the software project is large and the class hierarchy is complex. As a result, existing object-oriented programming languages do not facilitate incremental development of a software project by gradually replacing base classes with new derived classes.

SUMMARY OF THE INVENTION

In view of the foregoing, the present invention provides a new approach and language extension to object-oriented programming that uses replaceable classes and virtual constructors to enable the reuse of existing code written for creating objects of a base class to dynamically create objects of a new class inheriting from the base class. The class replacement can be implemented in both compiled and interpreted languages, but its advantages are especially significant when the source code containing the definitions of the replaceable classes is compiled to form a reusable module.

In accordance with the invention, a class that is intended to be replaceable later is declared in the source code as being a replaceable class. In subsequent software development, a replacement class derived from the replaceable class may be defined in new source code, and an instruction to replace the base class with the new derived class during program execution is included in the new source code. In the case where the programming language is a compiled language, such as the C++ language, the existing source code that defines the old base class may be compiled into a reusable module. The new source code with the replacement class is compiled into a new module, and the old and the new modules are then combined into an executable program.

During program execution, the replacement relationship between the base class and the new derived class is registered. When the instruction in the old code to create an object of the base code is executed, the registered replacement information is referenced. If registered replacement information indicates that the base class is to be replaced with the new class, an object of the new class is created instead of an object of the old class.

The class replacement allows an existing module to be reused to create objects of the new class without the need to modify and recompile the source code for the existing module. This ability to reuse existing code to create objects of new classes greatly facilitates incremental development of a software application by introducing new derived classes to provide refined functionality and features.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
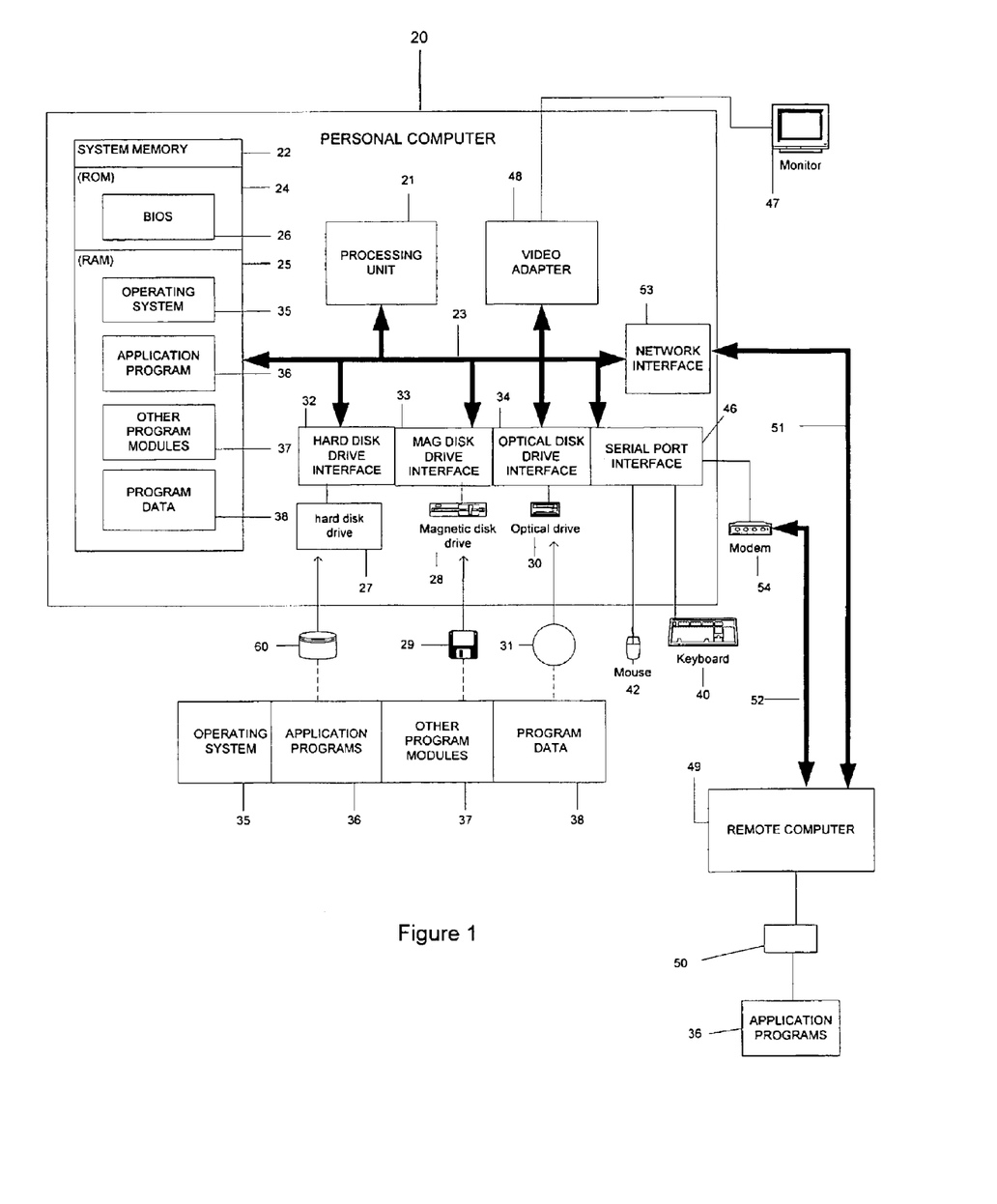
FIG. 1 is a block diagram generally illustrating an exemplary computer system on which the software development utilizing replaceable classes in accordance with the invention may be performed.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The present invention is directed to a way to enable a software developer to reuse existing code written for creating objects of a base class to create objects of a later-developed class derived from the base class. To allow an appreciation of the significant advantages provided by the invention, the problems encountered by software developers using conventional object-oriented programming languages caused by the inability to reuse existing code is first explained with the illustration in FIG. 2. At one point of the software development process, a software application 68 may include one or more existing reusable modules. Each of the existing modules may include instructions to create objects of various classes. For illustration purposes, FIG. 2 also shows a structure 69 of objects created in the dynamic memory by a reusable module 70, in which an object of a class M creates an objects of a class H, which creates objects of a class F, which in turn create objects of a class A. Although the hierarchy of objects in this example is simple, those skilled in the art will appreciate that the hierarchy of objects of a module in a large software application can become very complex.

Figure 2:
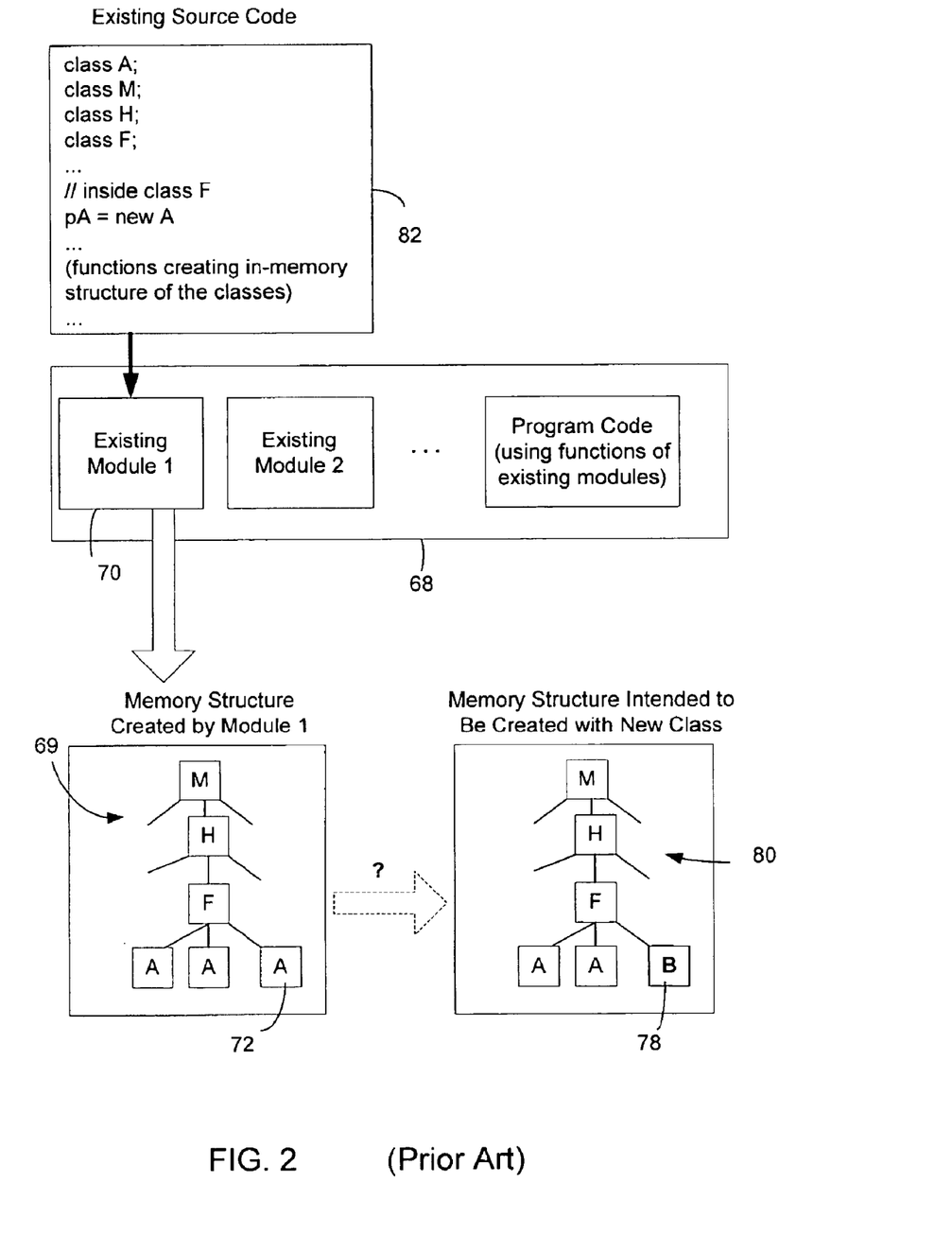
FIG. 2 is a schematic diagram showing a computer program with exiting modules that generate a memory structure of objects of given classes and a modified memory structure that is intended to be generated to contain objects of later developed new classes.

At a later stage of the software development after the reusable modules are generated, new classes inheriting from those classes used in the existing modules may be designed to provide refined functionality and features. Such new classes are intended to be used in the program where the old classes were used. In other words, objects of the new classes are to be created where the existing code would create objects of the old classes. With conventional object-orienting programming languages, however, it would be very difficult to reuse the existing modules to create objects of the new classes. For instance, a new class B derived from the old class A may be developed for use in place of the class A. The replacement may be selective, i.e., not all objects of the class A are to be replaced by objects of the class B. FIG. 2 shows, for example, a revised in-memory structure 80 of objects that is intended to be created by the use of the new class B in the new code. As shown in this desired new memory structure, an object 72 of the class A in the original hierarchy 69 is replaced with an object 78 of the new class B.

With conventional object-programming techniques, in order to achieve the new hierarchy, the source code 82 of the existing module 70 would have to be modified to include the definition of the class B, and selected instructions in the code to create objects of A would have to be changed to create objects of B. If the programming language is a compiled language, such as C++, the modified source code then has to be recompiled to generate a revised module. The need to perform extensive editing and recompiling makes it difficult to incrementally develop a software application by introducing new classes inheriting from previously developed classes. This problem is especially significant for large software projects using the object-oriented approach, where the flexibility of incremental development is needed the most, due to the complexity of the object hierarchies and the large number of reusable modules involved.

It will be appreciated that this replacement of objects of a base class with objects of a derived class is fundamentally different from the operation of overriding a function of a base class with a function of a derived class. In the existing C++ language, such "polymorphism" with respect to functions is through the use of "virtual functions." For virtual functions to work, both the base class and the derived class have to be defined in the source code of the executable module. In other words, the executable code has to know how to create objects of both the base class and the derived class. In contrast, in the example given in FIG. 2, the replacement class B may be designed after the reusable module 70 was generated.

In accordance with the present invention, the difficulties in reusing existing code to handle new classes are avoided through the use of replaceable classes and virtual constructors. The class replacement in accordance with the invention enables dynamic creation of objects of a new derived class instead of objects of a base class during execution of the existing code in the program. Thus, the use of replaceable classes makes the existing executable modules fully reusable in applications where objects of the newly developed derived classes are to be created. As a result, there is no need to edit and recompile the source listing of the existing executable modules to accommodate the new class.

Also, in many cases, it is very important to supply reusable modules without the corresponding source listings for various reasons, such as to save storage space or to avoid disclosure of proprietary technologies involved in the program sources or the tools used to build the program. Using replaceable classes in accordance with this invention would thus allow other users to modify the way an existing supplied reusable module works by developing new classes for their own specific solutions and features in a particular context.

As described in greater detail below, the class replacement may be implemented with both compiled languages and interpreted languages. Moreover, with a compiled language, the class replacement may be implemented either with an existing compiler or with a modified compiler that provides new features for supporting the class replacement.

Class Replacement with Compiler Support

Figure 3:
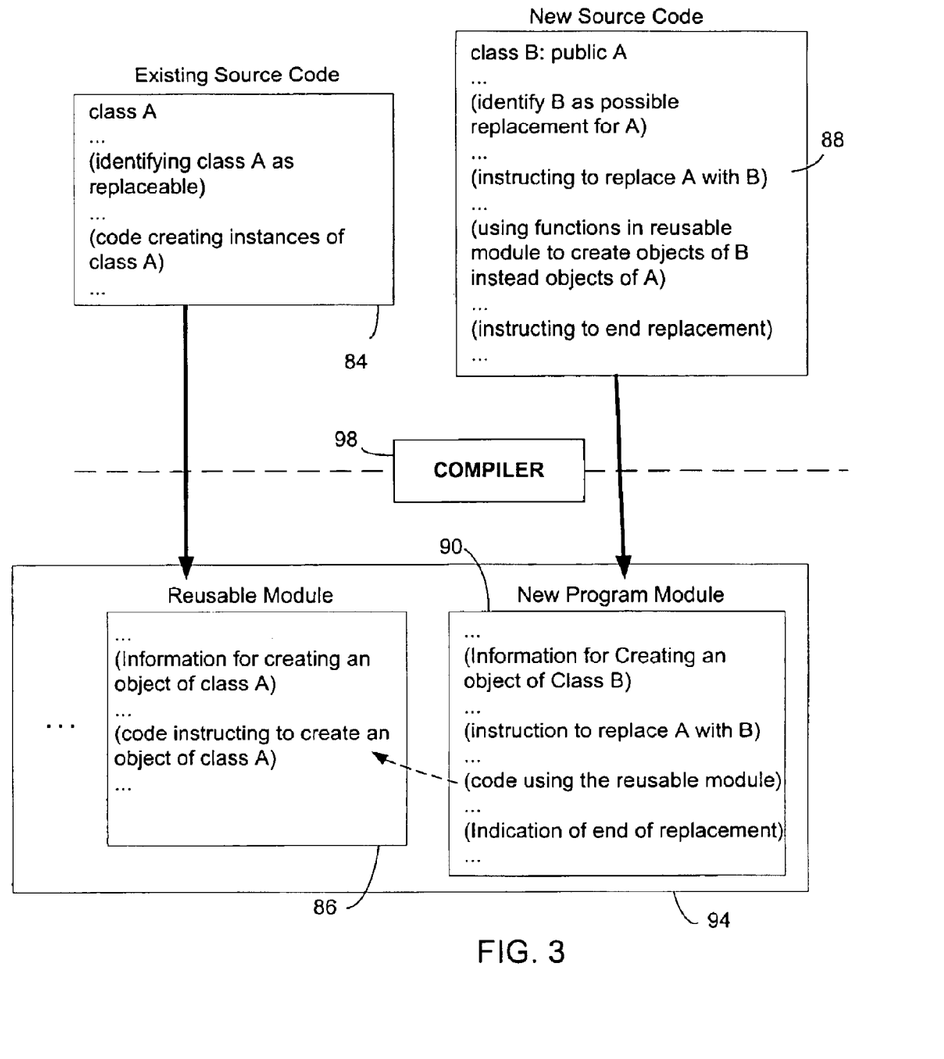
FIG. 3 is a schematic diagram showing a computer program that uses a reusable module with old classes to generate objects of new classes in accordance with the invention.

Referring to FIG. 3, a class A that is intended to be replaced later by a derived class is declared to be replaceable in a source listing 84. The source listing 84 containing the definition of A and instructions to create objects of A is then compiled into an executable module 86. Later, a class B intended to replace the class A is declared to be a replacement of the class A in a new source listing 88. The source listing 88 containing the definition of the class B and instructions to use the reusable module 86 is compiled into another module 90. The module 90 containing the new code is then combined with other modules, including the reusable module 86, to form an executable program 94. During the execution of the program 94, the new code in the module 90 calls special instructions to indicate, or register, the class replacement relationship between the classes A and B in a particular context. The code of the old module 86 is then executed when it is invoked by the new code, but now objects of the new class B will be created at selected places where the old code indicates the creation of objects of the old base class. Later, the new code may "un-register" the class replacement so that a subsequent call to the old code will result in the creation of objects of the class A as usual.

As will be described in greater detail below, the class replacement mechanism is based on the introduction of a layer of indirection in the object creation mechanism. Instead of directly using the type of either the replaceable class or the replacement class as the parameter for object creation, an object to be created is identified by class reference information. The replacement relationship between the class A and the class B is stored in a class replacement registration list, which maps the class reference of the base class to the one of the replacement class. During program execution, when an instruction in the old code is executed, the class replacement registration list is referenced to determine whether the object should be of class A or class B. Depending on which class is to be used for object creation, the proper class reference information will be used to create the correct object and invoke its constructor. Thus, an instruction in the existing code to create an object of the class A may result in the creation of an instance of the class B instead.

In a preferred embodiment, new compiler-supported features of the C++ language for handling the layer of indirection in object creation are provided to facilitate the use of replaceable classes. First, to identify replaceable classes in both the old and new code, the keyword "virtual" is enabled for the constructors of the replaceable classes. Specifically, to indicate that a class is replaceable, its constructor is declared to be "virtual." In the existing C++ language syntax, multiple constructors can be implemented in a class. Declaring a given constructor as "virtual" means that an attempt to create an object by calling this particular constructor may actually result in the creation of an instance of a yet unknown class that inherits from the class owning the virtual constructor. Once a base class is declared to be replaceable, a derived class that inherits from the base class can overwrite the "virtual" constructor of the base class. This overwriting constructor will be called each time an instance of the new class is to be created instead of an instance of the base class.

Any class with virtual constructors may also have static (i.e., conventional) constructors. The type of the instance created using a static constructor is hard-coded and can not be replaced.

All the destructors of classes that have virtual constructors should be virtual. The declaration of a static destructor in such classes should be treated as a compiler error, because the actual type of the object would not be known at the time the destructor is called. The compiler preferably automatically generates virtual destructors for the replaceable classes, if no destructors are declared.

By way of example, for a replaceable base class A and a replacement class B inheriting from the class A, the following partial source code shows how the constructors of the two classes are declared:

```
class A
{
    virtual A(int i) ; // the class A can be replaced
}
class B : public A
{
    virtual A(int i) ; // replacement constructor as A
    virtual B(int i, char *s) ;   // constructor used
                                  // by the new code.
}
```

In the above source listing, the statement "virtual A(int i);" in the definition of the class A indicates that the class A is replaceable. The statement "virtual A(int, i);", in the definition of the class B indicates that the class B may be used as a replacement for the class A. Here the class B has another constructor, B(int i, char s), so that it can be created from the new code with more information. Since this constructor is also declared as virtual, it is also replaceable, i.e., an attempt to create an instance of class B using this constructor may actually create an instance of another replacement class derived from B. As shown in FIG. 3, the class definitions for the classes A and B may be contained in separate source files, which are compiled into different object files. The compiler 98 emits the code for the virtual constructors in the code segments of the respective object files as if they were usual virtual methods.

In accordance with the embodiment, for each class with a virtual constructor, the compiler 98 emits a "Creation Information" block in the initialized data segment of the .obj file, along with the virtual function tables ("vtables") for the virtual functions of that class. The Creation Information block contains the size of the object and the offsets of all vtables inside the object. For a replacement class, the compiler also emits a CLSREF_DATA record for each of its base classes with virtual constructors, which contains a pointer to the Creation Information record and the offset of the base class in the instance of the current class. Also, for each class, a CLSREF_DATA record to create an object of the class as itself is always emitted. This CLSREF_DATA record has a vtable offset always set to 0. As will be described below, the CLSREF_DATA and Creation Information records of the replaceable and replacement classes are used to provide the layer of indirection in object creation for enabling class replacement.

Figure 4:
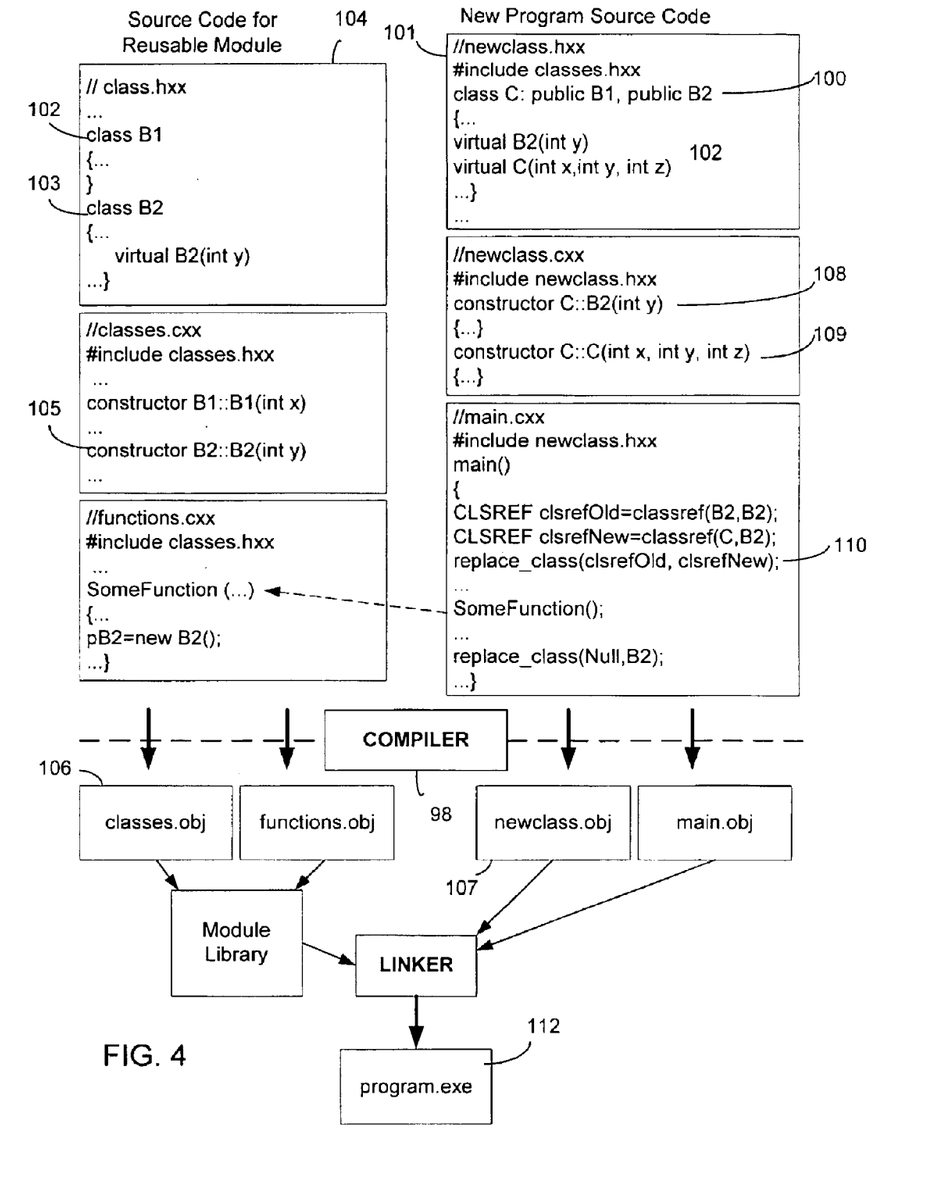
FIG. 4 is a schematic diagram showing the compilation of exemplary source listings into respective object (.obj) files with data emitted therein for supporting class replacement in accordance with an embodiment of the invention.

To illustrate the data emitted by the compiler into the object files to support class replacement and how such data are interrelated and used, FIGS. 4–8 provide an example in which a class C inheriting from a conventional (i.e., non-replaceable) class B1 and a replaceable class B2. The new class C can be used as a replacement for the class B2. Turning first to FIG. 4, the class C 100 is described in a new source listing 101, and both the classes B1 and B2 are described in an old source listing 104. In the illustrated example, the old source listing 104 includes a header file named "classes.hxx", a class definition file named "classes.cxx", and a "functions.cxx" file that contains instructions to create instances of the class B2. More detailed exemplary partial source code for these three files of the old source listing 104 is provided below.

```
// classes.hxx
class B1
{
public:
    // non-virtual constructor
    //=>class B1 can't be replaced
    B1(int x) ;
    virtual void XMove( )
protected:
    int m_x;
} ;
class B2
{
public:
    // class B2 can be replaced
    virtual B2(int y)
    virtual void YMove( )
protected:
    int m_y
} ;
// classes.cxx
#include classes.hxx
B1::B1(int x)
{ m_x=x; } ;
void B1: :XMove( )
{ m_x++; } ;
B2: :B2(int Y)
{ m_y=y; } ;
void B2 : : YMove( )
{ m_y++; } ;
// functions.cxx
#include classes.hxx
SomeFunction( . . . )
{
    . . .
    B2* p32=NULL;
    . . .
    pB2=new B2 ( ) ;
    . . .
}
```

The new source listing 101 includes a header file named "newclass.hxx", a class definition file named "newclass.cxx" in which the class C is defined as a possible replacement for B2, and a "main.cxx" file that uses the functions in the old code. Exemplary partial code for these files are provided below:

```
// newclass.hxx
#include classes.hxx
class C: public B1, public B2
{
public:
// replacement constructor "as B2"
virtual B2(int y)
// class C can be replaced too
virtual C(int x, int y, int z)
virtual void MoveAll( )
private:
    int m_z;
} ;
. . .
// newclass.cxx
#include newclass.hxx
C: :B2(int y)
{m_x=10; m_y=y; m_z=10} ;
C: :C(int x, int y, int z)
{ m_x=x, m_y=y; m_z=z; } ;
void C: :MoveAll( )
    { m_x++; m_y++; m_z++} ;
// main.cxx
#include newclass.hxx
. . .
main( )
```

```
{
// replace the class B2 with C
CLSREF clsrefOld=classref(B2,B2) ;
CLSREF clsrefNew=classref(C,B2) ;
replace_class(clsrefOld, clsrefNew) ;
. . .
// Reuse the old code functions,
// with the new classes
SomeFunction( ) ;
. . .
// Un-register the class replacement
replace_class(NULL,B2) ;
}
```

In the old source listing 104, the base class B2 is declared to be replaceable by using the keyword "virtual" in the declaration 105 of its constructor B2::B2. In contrast, the base class B1 is not replaceable because its constructor is not "virtual."

Figure 5:
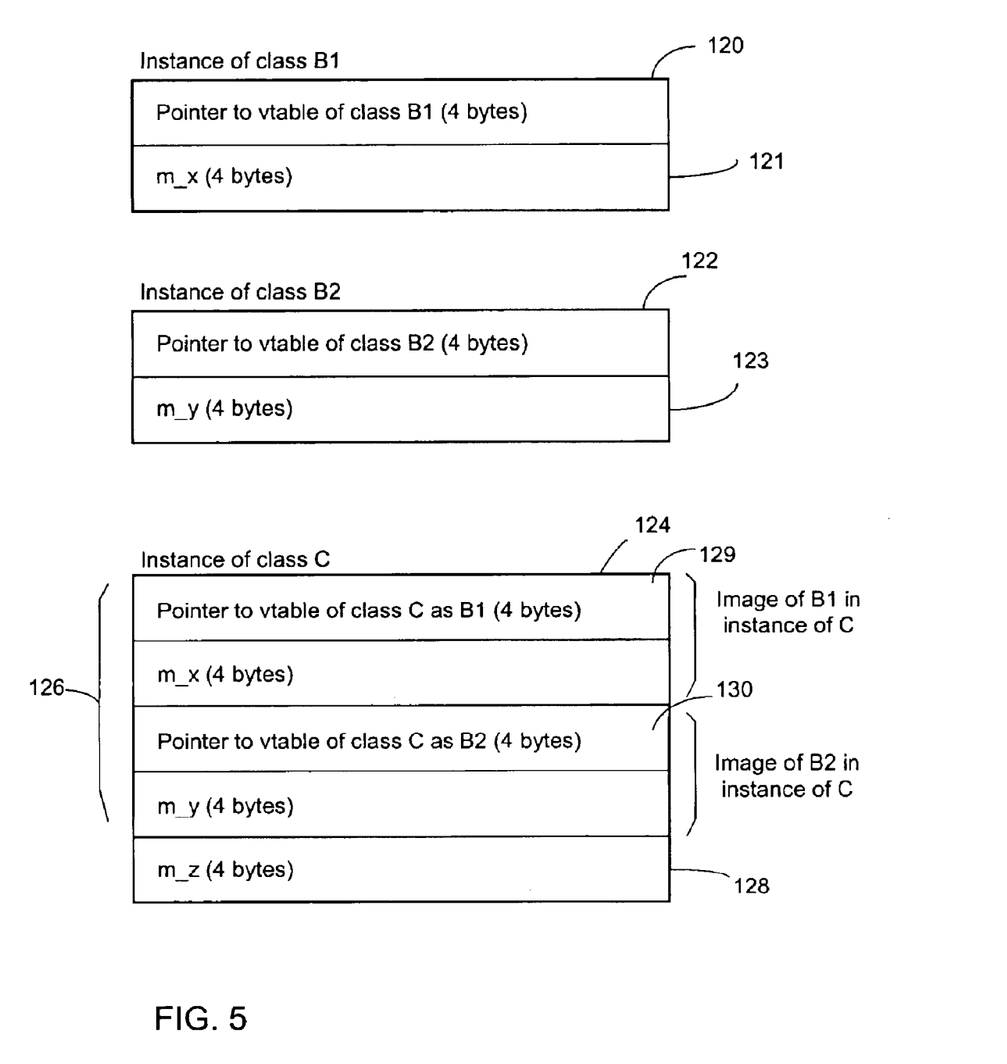
FIG. 5 is a schematic diagram showing memory images of objects of two base classes and a replacement class that inherits from the two base classes.

FIG. 5 shows how the respective objects of the three classes B1, B2, and C appear in the memory. It should be noted that the memory images of these objects are not changed for supporting class replacements, i.e., they are the same as those that would be generated with the existing C++ compilers without class replacement. This allows the usage of the instances of the replaceable classes from functions compiled with the existing compilers. Since both the classes B1 and B2 have virtual functions, their objects 120 and 122 have pointers 121 and 123, respectively, to their associated virtual function tables. Because the class C inherits from B1 and B2, its object 124 has a first part 126 for the functions and data inherited from B1 and B2, and a second part 128 for its own data members. If an instance of the class C is used via a pointer of type C* or B1*, the virtual methods will be called using the pointer 129 to the vtable for B1 and C methods. If the same instance is used via a pointer of type B2*, the virtual methods will be called using the vtable pointer 130, which is at an offset of 8 bytes from the pointer "this" of the instance 124.

Figure 6:
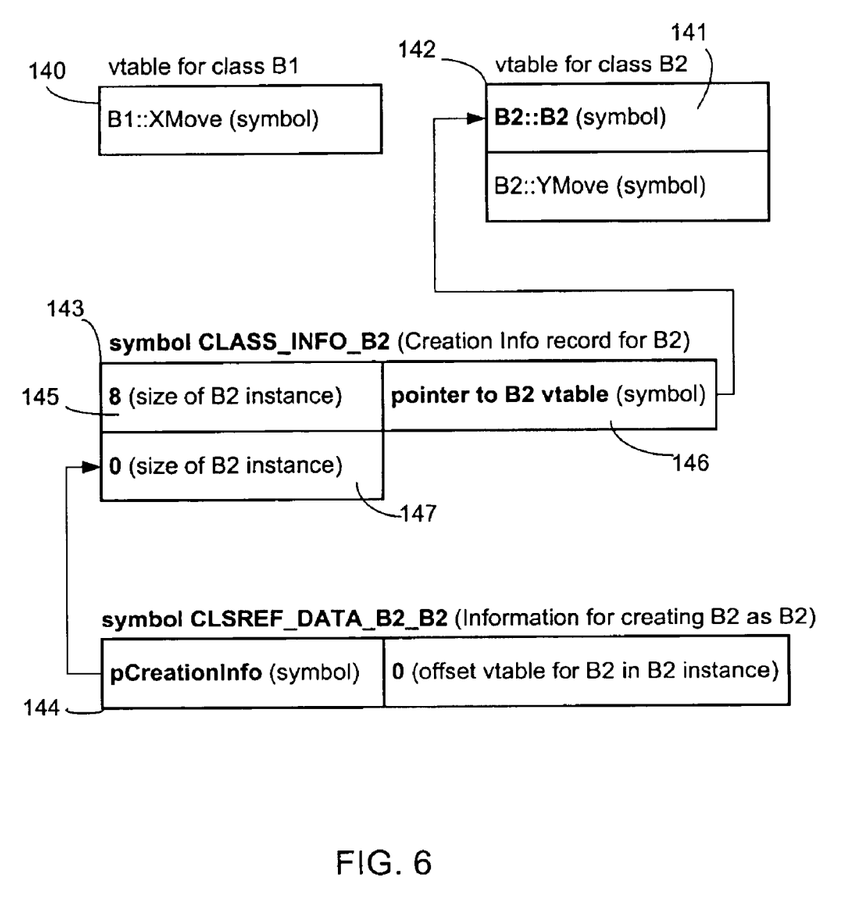
FIG. 6 is a schematic diagram showing data emitted into the initialized data segments of the .obj file for the base classes from FIG. 4 for supporting class replacement.

FIG. 6 shows the Creation Information and CLSREF_DATA records emitted by the compiler 98 in the initialized data segment of the classes.obj file 106 when compiling the old source listing 104 (FIG. 4). The new data (as opposed to those emitted by a conventional compiler) emitted by the compiler 98 for supporting the class replacement are shown in bold type. Here, since the class B1 is not replaceable, the compiler emits only the vtable pointer 140, which consists of one pointer to the only virtual function, XMove, of the class B1. The compiler puts here the "symbol" of the method B1::XMove, by emitting a fixup record which the linker will replace with the real address later, when the executable program 112 is created.

In contrast, the constructor B2::B2 has been declared as "virtual" in the old source listing 104 (FIG. 4). Accordingly, the compiler 98 emits a pointer 141 to it in the virtual table 142 for B2. The code for this virtual constructor is emitted in the code segment just like the code for the usual virtual methods. Furthermore, since the class B2 is replaceable, the compiler also emits a "Creation Information" record CLASS_INFO_B2 143 and a CLSREF_DATA_B2_B2 record 144, which describes how to create an instance of the class B2. Since the class B2 does not inherit from any classes with virtual constructors, it could not be used as a replacement class, and thus no more CLSREF_DATA records are emitted.

The source listing for the new code 101 (FIG. 4) is compiled to another .obj file 107 named "newclass.obj". The data emitted by the compiler in the initialized data segment of this .obj file is show in FIG. 7. Since the class C inherits from two base classes, namely B1 and B2, that have virtual methods, it has two separate vtables. The vtable 150 contains the pointers to the methods of the class C as B1, and the vtable 151 contains pointers to the methods of the class C as B2. The new methods of the class C, which are not present in any of the base classes, are usually added in the vtable for the first class—here B1, after all the pointers for the inherited methods. In this example, the new data emitted by the compiler for supporting class replacement include pointers 152, 153, and 154 in the vtables 150, 151 that point to the respective constructors C::B2(int y) and C::C(int x, int y, int z).

Figure 7:
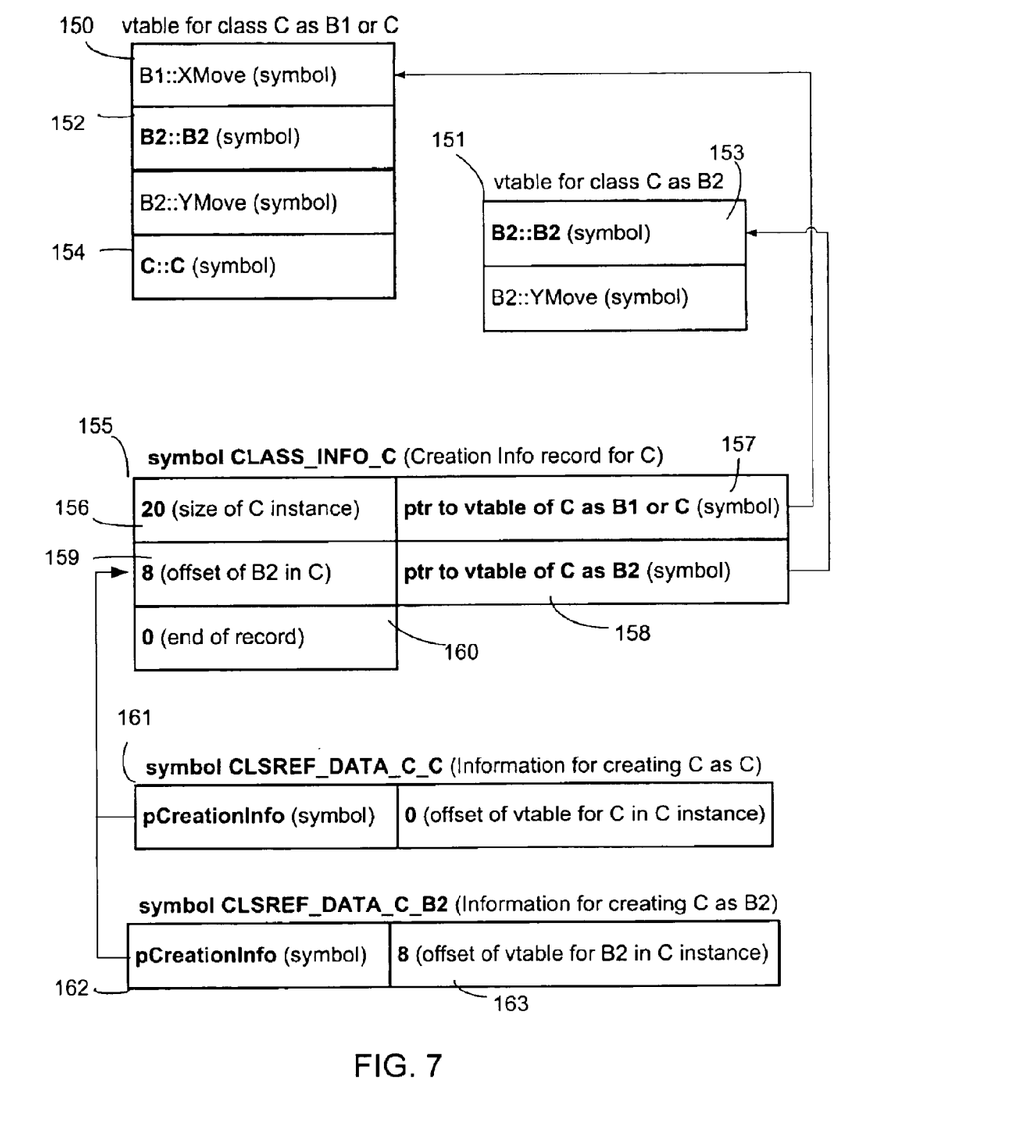
FIG. 7 is a schematic diagram showing the data emitted into the initialized data segment of the .obj file for the replacement class from FIG. 4 for supporting class replacement.

The Creation Information block 155 for the class C includes a field 156 for the size of an object of C (20 bytes in this example), pointers 157, 158 to the vtables which present in all instances of the class C, and the offset 159 of the class B2 in the object of C (8 bytes in this example). Since the data for class B1 is always at offset 0 in instances of class C (which is how the existing C++ compilers work), the first field 156 of the Creation Information record is used for the object size instead. The end of the creation information record is indicated by value 0 in the field 160 for vtable offset.

In this example, there are two CLSREF_DATA records for the class C that are emitted into the .obj file 107 (FIG. 4). The record CLSREF_DATA_C_C 161 describes how to create an instance of the class C as itself, and the record CLSREF_DATA_C_B2 162 describes how to create an instance of C as a replacement for the base class B2.

To use the above-described new data emitted in the initialized data segments of the .obj files, a new compiler-supported datatype "CLSREF" is defined as follows:

```
class CLSREF_DATA
{
public:
    LPVOID pCreationInfo;
    DWORD dwVtableOffset;
};
typedef CLSREF *CLSREF_DATA;
```

In essence, a variable of the CLSREF type is a pointer that is used to point to a CLSREF_DATA record of a given class. The program obtains the CLSREF objects by means of a new compiler-supported function:

CLSREF classref(Class,BaseClass);

When the compiler sees a "call" to this function, it will emit instructions to return a CLSREF pointer to the proper CLSREF_DATA record that was emitted by the compiler when processing the class definition. Note that the compiler will actually emit the symbol here and the linker will later replace this symbol with the real pointer to the CLSREF_DATA record in the initialized data segment. As an example, from the point of view of the program which uses the classes from FIG. 4, calling classref(C,B2) will return the pointer to the CLSREF_DATA_C_B2 record 162 as shown in FIG. 7, while calling classref(C,C) will return the pointer to the CLSREF_DATA C_C record 161.

In a preferred embodiment, the compiler support for class replacement also includes two special implementations of the "new" operator that function differently from the conventional "new" operator of the C++ language. An object of a replaceable class can be created by using either the operator "static_new", which accepts the CLSREF variable type, or the operator "new", which has the usual syntax of the "new" operator of the conventional C++ language but may result in the creation of an object of some replacement type. As described in greater detail below, the implementation of the "new" operator for class replacement utilizes the implementation of the "static new" operator.

The operator "static_new" creates an instance of a class given by a CLSREF variable, treating it as the explicitly indicated base class:

<Class*>static_new <CLSREF>BaseClass( . . . );

This operator will return a pointer to a new instance of the class identified by the CLSREF variable. Here " . . . " stands for the constructor parameters in the namespace of "BaseClass". If the CLSREF variable is omitted, the pointer to the CLSREF_DATA record indicating creation of the class "BaseClass" as itself will be used instead.

When the compiler sees the "static new" operation used in the code, it will emit instructions in the .obj file to:

1) Allocate memory of the size indicated in the Creation Information record identified in the CLSREF_DATA object pointed to by the CLSREF variable.
2) Write the pointers to all vtables at the proper offsets indicated by the offset values in the Creation Information record, thus constructing an not-yet-initialized instance of the class for which the CLSREF_DATA record is used.
3) Add the value of the vtable offset indicated in the CLSREF_DATA record to the pointer to the data block just allocated. The pointer thus obtained will be treated as an instance of the class "BaseClass" that was passed as argument.
4) Call the virtual constructor of "BaseClass" which matches the argument list. Since the constructor is "virtual", it is called using the vtable pointer pointed to by the pointer obtained above in step 3, so that the constructor for the new class is called.
5) Return the pointer obtained above, as if it was a "BaseClass" instance.

For example, in the case of the classes B1, B2 and C of FIG. 4 where C was declared as a possible replacement for B2, with the following sample code:

B2 *pB2=NULL;
CLSREF ref=classref(C,B2);
pB2=static_new ref B2(3);

the compiler performs the following operations:

For the line "CLSREF ref=classref(C,B2);"
  Allocate space for a local pointer variable "ref";
  Emit code to initialize the variable "ref" with the address of the CLSREF_DATA_C_B2 record 162 (FIG. 7) which provides information regarding how to create an instance of class C when B2 is expected (the compiler puts the symbol here and the linker puts the proper address later).

For the line "pB2=static_new ref B2(3);
  Using the CLSREF_DATA record pointed to by the local variable "ref", allocate memory space of the size indicated in the associated Creation Information record. In this example, the variable "ref" points to the CLSREF_DATA_C_B2 record 162, which in turn points to the Creation Information record 155. As a result, the Creation Information record 155 for class C is used. According to the field 156, 20 bytes of memory are allocated.
  Copy the pointers to all vtables from the Creation Information record—The pointer to the vtable for C treated as B1 is copied from field 157 to the location at offset 0 of the object. The pointer to the vtable of the class C treated as B2 is copied from field 158 to the location at the offset of 8 bytes according to the field 159. The record field 160 is 0, indicating that there is no more vtable pointer to copy. Now the newly allocated block looks like the memory image of the instance of class C 124 from FIG. 5. Still, all the data except for the vtable pointers are uninitilized.

Add the "offset of the vtable" specified in the CLSREF_DATA record to the new block pointer—here this is 8 bytes (field 163), which is the offset of the class B2 in the instance of class C (see FIG. 5)

For this instance of B2, call the virtual constructor B2(int y) with argument value 3. This is the first method in the vtable, but the vtable here is the vtable 151 for C treated as B2, so the constructor C::B2(int y) is actually called.

return the B2 pointer obtained above to the program.

The program may now continue, using the above instance of class C by the B2 pointer as usual.

In a preferred embodiment, the implementation of the operator "delete" is also changed for supporting class replacement. Because of the dynamic class replacement, it should not be assumed that the pointer to the object to be deleted is the same as the pointer of the memory block allocated for the object. To that end, additional code is emitted in all virtual destructors to return the pointer to the real object (i.e., the pointer "this"). The delete operation will then first call the virtual destructor (as with existing compilers), and then use the returned pointer to delete the memory block, instead of using the pointer to the object passed as an argument. Note that the returning of "this" pointer from the destructors is hidden from the program—"return" should not be used in the source code of the destructors as in the current C++ standard. As mentioned above, if no destructor is declared for a given class, the compiler will generate one just to return the pointer "this".

It should be noted that the creation of class instances based on a CLSREF variable as described above is not yet automatic "class replacement", because in order to use the static_new operator, the program has to know explicitly the CLSREF value of the new class. In contrast, the automatic class replacement is carried out by dynamically passing the correct CLSREF value for the class of the object to be created. This operation is enabled by registering class replacement relationship between the old base class and a new replacement class. In the present embodiment, the class replacement relationship is registered on a per-thread basis using the following data structure:

```
typedef struct _CLASS_REPLACEMENT
{
    CLSREF clsrefClass;
    CLSREF clsrefReplacement;
} CLASS_REPLACEMENT;
``` where clsrefClass represents a base class to be replaced, and clsrefReplacement represents a class intended to replace the base class. This data structure is used to dynamically track the class replacement relationship between classes.

Figure 8:
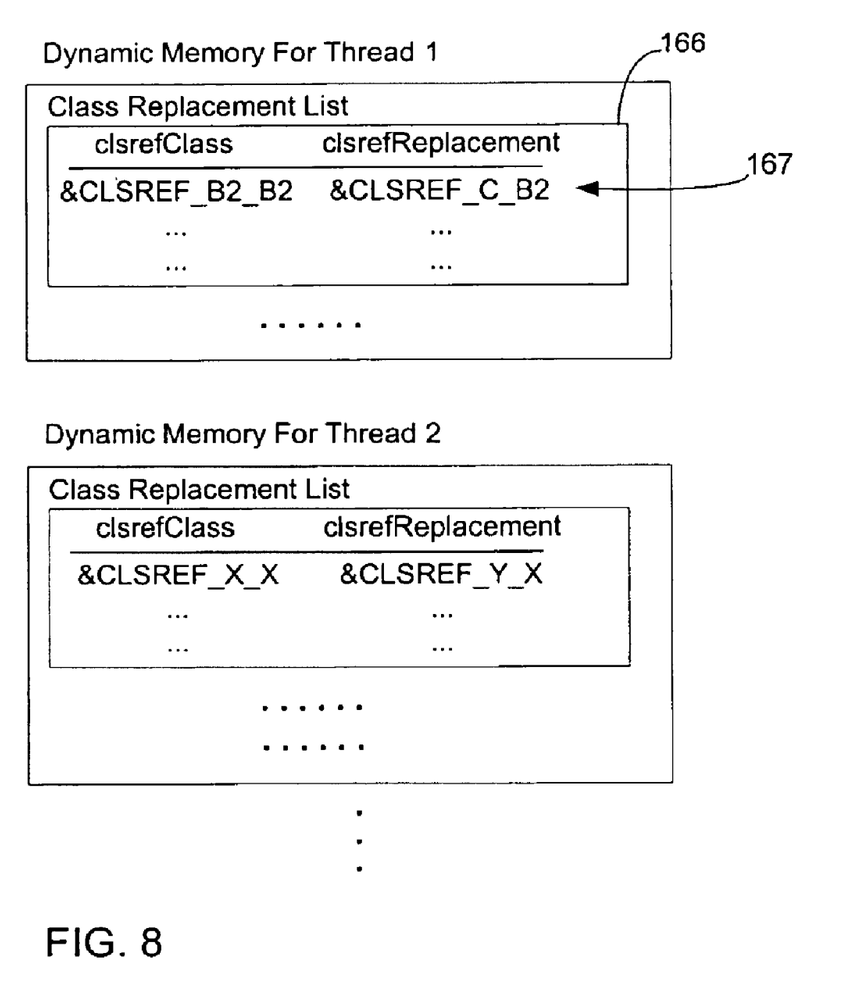
FIG. 8 is a schematic diagram showing a memory image of a per-thread registered list of replaceable classes and corresponding replacement classes.

For the registration of class replacement, a compiler-supported function is provided:

replace_class(BaseClass; ReplacementClass);

For example, when the compiler processes a source line:

replace_class(B2,C);

it emits code that will add a CLASS_REPLACEMENT record to the list 166 of the class replacements in the memory space for the current thread, as illustrated in FIG. 8. As shown in FIG. 8, for the present example, this CLASS_REPLACEMENT record 167 will be initialized to the address of CLSREF_DATA_B2_B2 record 144 (FIG. 6) describing the creation of class B2 as itself, and the clsrefReplacement will be initialized to the address of the CLSREF_DATA_C_B2 record 162 (FIG. 7) describing the creation of C as B2. In a preferred embodiment, another compiler-supported function is provided for un-registering the class replacement, thereby allowing class replacement to be dynamically switched on and off during program execution.

The dynamic replacement of classes is invoked by using the operator "new," the implementation of which has been modified to support class replacements. For example, when the compiler processes the line pB2=new B2(3);

the following code is emitted into the .obj file:

A call to a compiler-supported function that searches the list of replacement records for the current thread. The CLSREF variable pointing to the CLSREF_DATA record of the class B2 created as itself (i.e., the CLSREF_DATA B2_B2 record 144 in FIG. 6) will be passed to this function as an argument. If the function finds a record in the registered replacement list for the base class, the function will return the CLSREF variable pointing to the CLSREF_DATA record for the replacement class (in this case the CLSREF_DATA_C_B2 record 162 in FIG. 7). On the other hand, if no replacement record for B2 is found, the function simply returns the CLSREF argument passed to it.

A call to static_new to create an object using the CLSREF returned above.

If no replacement for the class B2 is registered, the program will obtain a new instance of the class B2 as requested. If, on the other hand, the replacement of B2 with C is registered, an object of C will be created instead. In this way, class replacement is accomplished.

It will be appreciated that this replacement is fundamentally different from any implementations of similar functionality, which create objects based on type references by searching some collection of all the "known" types. For example COM creates the objects based on CLSREF and the COM components may be replaced, but at very high cost—searching the registry for all CLSREF-s known in the system, in order to create a single instance. On the contrary, in both the embodiments described above, only the registered replacements are searched. Basically, the performance of "new" will be almost the same as without the class replacement support, unless many thousands of class replacements are registered (a very unusual case).

Class Replacement Using an Existing Compiler

Although the embodiment described above proposes new compiler support for replaceable classes, class replacement according to the invention may be implemented without the need to modify existing compilers. By way of example, one such embodiment is described below.

Similar to the embodiment with new compiler support, class replacement in this embodiment is based on a layer of indirection in object creation. In this embodiment, the indirection is achieved by using "Instance Creator" classes, which are derived from a base class ClassRef:

```
class ClassRef
{
    friend class CObjCreator;
public:
    virtual LPVOID CreateInstance( )
        { return NULL; } ;
    ...
};
```

The CLSREF type in this embodiment is declared as:
   typedef ClassRef* CLSREF;
For each replaceable class, an object derived from the ClassRef class is created to implement the CreateInstance( ) method for creating an object of that replaceable class. This is achieved by using the following template:

```
template <class Type, class Base> class ClassRef__ :
public ClassRef
{
public:
    virtual LPVOID CreateInstance( )
    {
        Type *pNew = new Type;
        if (NULL!=pNew)
        {
            return static_cast<Base*>(pNew) ;
        }
        else
        {
            return NULL;
        }
    };
};
```

To identify a class as replaceable, a special macro REPLACEABLE_CLASS(Class,BaseClass) is used, which hides the usage of the template above:
   #define REPLACEABLE_CLASS(class_name,base_class) \
   ClassRef__<class_name,base_class> \
      CLASS_##class_name_##base_class( ); \
   CLSREF CLSREF_##class_name_##base_class= \
   &CLASS_##class_name_##base_class;
For example, if a class B inherits from some class A, adding the line
   REPLACEABLE_CLASS(B,A);
at global level will result in the creation of an object named CLASS_B_A, which is the creator of objects of the class B instead of A, and an object CLSREF_B_A of the type ClassRef*, initialized to point to the above creator.

Similar to the case of "static_new" in the embodiment with compiler support above, an instance of the class B in place of the class A is created as follows:
   A* pA;
   pA=CLSREF_B_A->CreateInstance( );
Since in this embodiment the compiler is a conventional one that does not support class replacement, the behavior of the operator "new" cannot be altered to support class replacement. Instead, all the instances of the replaceable classes should be created by an instance of special class CobjCreator, which supports the class replacement operation. Specifically, the method CObjCreator::Create takes a pointer to an object derived from ClassRef that knows how to create objects of the new class:
   HRESULT CObjCreator::Create( CLSREF clsref, LPVOID* ppNewObject);

To enable class replacement, the class replacement relationship between the old base class and the new derived class is first registered by calling the method CobjCreator:: ReplaceClass declared as follows:
   HRESULT CObjCreator::ReplaceClass( CLSREF clsrefOld, CLSREF clsrefNew);
where clsrefOld is a pointer to the Classref object for the old class that is to be replaced, and clsrefNew is a pointer to the ClassRef object for the new class that replaces the old class. This causes the CObjCreator object to add a record in its internal list of replacements. The replacement record is a structure of type CLASS_REPLACEMENT defined in the previous embodiment. Note that the replacement is valid only for the objects created by this instance of CObjCreator, until the replacement is changed or all the replacements are reverted.

In this embodiment, in order to keep the implementation of CObjCreator independent of the particular syntax of the constructors of the replaceable classes, it is expected that their actual constructors will have no arguments. The data members of the new instance created will be instantiated later by some virtual method. This method is then Virtual Constructor, in the sense that the object data is un-initialized and the object could not be used before calling this method. It is up to the newly created object to call the initializing methods for its base classes.

The following description provides an example to illustrate the mechanism of class replacement in this embodiment. This example involve a class CBase1 and a class CBase2 that do not inherit from any classes, a class CInherited that inherits from both CBase1 and CBase2 as public, a class CReplace1 that inherits from CBase1 as public, a class CReplace2 that inherits from CInherited as public, and a class Creplace3 that inherits from Cbase2 as public. These classes have different implementations of the method: virtual void Init( ); which prints the name of the respective class. At the global level, the classes are declared in the source listing to be replaceable as follows:
   // At global level
   REPLACEABLE_CLASS(CBase1,CBase1);
   REPLACEABLE_CLASS(CBase1,CBase2);
   REPLACEABLE_CLASS(CInherited,CInherited);
   REPLACEABLE_CLASS(CReplace1,CBase1);
   REPLACEABLE_CLASS(CReplace2,CInherited);
   REPLACEABLE_CLASS(CReplace3,CBase2);

As described above, these declarations cause the creation of the respective ClassRef objects: CLSREF_CBase1_CBase1, CLSREF_CBase2_CBase2, CLSREF_CInherited_CInherited, CLSREF_CReplace1_CBase1, CLSREF_CReplace2_CInherited, and CLSREF_CReplace3_CBase3 to be created. In this example, an object named Creator of the class CObjCreator is used to create objects of these replaceable classes. Instructions to replace CBase1, CBase1, and CInherited with CReplace1, CReplace3, and CReplace2, respectively, are provided by using the Creator.ReplaceClass function in the "main" portion of the code as follows:
   // in main( )
   CObjCreator Creator;
   CBase1 *pBase1=NULL;
   CBase2 *pBase2=NULL;
   CInherited *pInherited=NULL;
   Creator.ReplaceClass(
      CLSREF_CBase1_CBase1,CLSREF_CReplace1_CBase1);

```
Creator.ReplaceClass(
CLSREF__CInherited__CInherited,CLSREF__CReplace2__
    CInherited);
    Creator.ReplaceClass(
        CLSREF__CBase2__CBase2,CLSREF__CReplace3__
        CBase2);
// In some reusable function
Creator.Create(CLSREF__CBase1,(LPVOID*)&pBase1);
    pBase1->Init( );
    Creator.Create(CLSREF__CInherited,(LPVOID*)
        &pInherited);
    pInherited->Init( );
    Creator.Create(CLSREF__CBase2,(LPVOID*)
        &pBase2);
    pBase2->Init( );
```

Due to the class replacement, the objects created by the Creator.Create function are those of the replacement classes CReplace1, CReplace3, and CReplace2, instead of those of the replaced classes CBase1, CBase1, and CInherited, even though they appear as arguments for the Creator.Create function. If the Init functions are implemented to print the name of the class, the output of the program would be:

CReplace1
CReplace2
CReplace3

Although in this example the Create function is invoked in the "main" portion of the program, it will be appreciated that the instructions to create objects of the replaceable classes may be included in an existing reusable module that was developed before the replacement classes were designed. Note that the old code needs to know only about the CobjCreator object and the replaceable base classes. It did not have to know about the new derived classes at compile time in order to be reusable for creating objects of the new classes.

Class Replacement with an Interpreted Language

The class replacement in accordance with the invention can be also supported in interpreted languages. For example, class replacement with an interpreted language may be implemented in substantially the same way as the embodiment with compiler supported-features as described above. The main difference is that the Creation Information and CLSREF records would be internal data to the interpreter created when it reads the class definitions, instead of being emitted in a reusable form such as a .obj file. Again, a list of the class replacements will be kept in per-thread basis, and the new operator will first search the class replacement list and eventually create instance based on the replacement CLSREF instead of the one passed as argument.

In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of constructing a computer program developed with an object-oriented programming language, the method comprising:

declaring a base class as replaceable in a first source file;

invoking, in the first source file, an operator to create an object of the base class;

compiling the first source file into a first module, including emitting an instruction to create an object of the base class in response to the invoking of the operator to create in the first source file;

defining a replacement class inheriting from the base class in a second source file;

instructing in the second source file to replace the base class with the replacement class to cause creation of an object of the replacement class when the instruction in the first module to create an object of the base class is executed during program execution, the program execution occurring after the compiling of the first source file, the creation of the object of the replacement class occurring without recompiling the first source file;

compiling the second source file into a second module; and combining the first and second modules in an executable program.

2. A method as in claim 1, wherein the object-oriented programming language is the C++ language.

3. A method as in claim 2, wherein the step of declaring the base class as replaceable includes defining a virtual constructor of the base class.

4. A method as in claim 2, further including declaring the replacement class as a replacement of the base class by defining a constructor of the replacement class for replacing the base class.

5. A method as in claim 1, wherein the step of compiling the second source file includes emitting in the second module an instruction to generate a class replacement record indicating that the replacement class is a replacement of the base class.

6. A method as in claim 5, wherein the step of compiling the first source file includes emitting an instruction in the first module to search for a class replacement record concerning the base class.

7. A method as in claim 6, wherein the step of compiling the first source file includes emitting creation information for an object of the base class in the first module, and wherein the step of compiling the second source file includes emitting creation information for an object of the replacement class in the second module.

8. A method of constructing source code in an object-oriented programming language, comprising the steps of:

declaring a base class as replaceable in a first source file;

defining a replacement class inheriting from the base class in a second source file;

declaring in the second source file that the replacement class is a replacement for the base class;

entering in the second source file an instruction to replace the base class with the replacement class during program execution, the program execution to occur after a compiling of the first source file, the replacing to occur without recompiling the first source file.

9. A method as in claim 8, wherein the object-oriented programming language is the C++ language.

10. A computer-readable medium having computer-executable instructions to perform a method for compiling a source listing in an object-oriented programming language into an executable module, the method comprising:

upon reading a statement in the source listing defining a first class as replaceable, emitting into the executable module a creation information block for the first class;

upon reading a statement in the source listing defining a second class inheriting from the first class as a replacement for the first class, emitting into the executable module a creation information block for the second class;

upon reading an instruction in the source listing to replace the first class with the second class, emitting an instruction to store a class replacement record for the first and second classes in a class replacement registration list; and upon reading an instruction in the source listing to create an object of the first class, emitting into the executable module:

an instruction to search the class replacement registration list and to return a pointer to the creation information block for the second class if a class replacement record for the first and second classes is found and otherwise to return a pointer to the creation information block for the first class; and an instruction to create, during program execution, an object according to the creation information block pointed to by the returned pointer, the program execution to occur after a compiling of the source listing, the creation of the object according to the creation information block to occur without recompiling the source listing.

11. A computer-readable medium as in claim 10, including further computer-executable instructions to perform the step of emitting a virtual destructor for the first class for deleting the object created.

12. A computer-readable medium as in claim 10, wherein the object-oriented programming language is the C++ language.

* * * * *